United States Patent [19]
Cox et al.

[11] Patent Number: 5,000,905
[45] Date of Patent: Mar. 19, 1991

[54] STRETCH BLOW-MOULDING THERMOPLASTICS ARTICLES

[75] Inventors: Andrew P. D. Cox, Berkshire; Terence P. McCormack, Oxfordshire; Percy W. Morris, Berkshire, all of England

[73] Assignee: CMB Packaging (UK) Limited, England

[21] Appl. No.: 488,023

[22] PCT Filed: Jul. 19, 1989

[86] PCT No.: PCT/GB89/00828
§ 371 Date: May 16, 1990
§ 102(e) Date: May 16, 1990

[87] PCT Pub. No.: WO90/00962
PCT Pub. Date: Feb. 8, 1990

[30] Foreign Application Priority Data

Jul. 21, 1988 [GB] United Kingdom ............... 8817390.1

[51] Int. Cl.⁵ ............... B29C 49/04; B29C 49/14; B29C 49/68
[52] U.S. Cl. ............... 264/532; 264/535; 264/540; 425/526; 425/529; 425/531; 425/532; 425/534
[58] Field of Search ............... 264/532, 535, 540, 542; 425/526, 529, 531, 532, 534

[56] References Cited

U.S. PATENT DOCUMENTS

| | | | |
|---|---|---|---|
| 3,149,373 | 9/1964 | Marzillier | 425/526 |
| 3,324,507 | 6/1967 | Arlo | 425/526 |
| 3,339,230 | 9/1967 | Farrell | 425/526 |
| 3,449,792 | 6/1969 | Plummer | 425/529 |
| 3,462,582 | 8/1969 | Cines | 219/388 |
| 3,787,170 | 1/1974 | Gilbert | 425/534 |
| 4,323,337 | 4/1982 | Korff | 425/155 |
| 4,560,340 | 12/1985 | Younkin et al. | 425/534 |

FOREIGN PATENT DOCUMENTS

1495719 9/1967 France .
2265645 10/1975 France .

*Primary Examiner*—Jan H. Silbaugh
*Assistant Examiner*—Catherine Timm
*Attorney, Agent, or Firm*—Diller, Ramik & Wight

[57] ABSTRACT

A method is described for stretch blow-moulding thermoplastics bottles (50) from heated parisons of thermoplastics material such as polypropylene. The parisons are severed from thermoplastics sticks (51) each of which is formed of several, e.g. five, parison lengths. The sticks are severed from the leading end of a continuously extended thermplastics tube, and are individually heated in an oven to orientation temperature. After heating, the sticks are presented for severance as successive groups of associated sticks which are advanced longitudinally one parison length at a time while disposed in parallel, laterally aligned relation. The bottles are formed by repeated stretch blow-moulding operations upon the groups of parisons so produced.

12 Claims, 6 Drawing Sheets

STRETCH BLOW-MOULDING THERMOPLASTICS ARTICLES

This invention relates to the stretch blow-moulding of thermoplastics articles, in particular (but not exclusively) packaging containers for food or beverage products.

In a known system for forming tubular parisons of a thermoplastics material (for example polypropylene) for a stretch blow-moulding operation, a tube of the material is extruded on a continuous basis and on emerging from the extruder passes through successive sizing and cooling stages. Whilst still in essentially continuous form it is subsequently passed at a constant speed through a multi-pass oven by which it is heated to orientation temperature, and on emerging from the oven it has its leading end cropped or severed at regular intervals to form a succession of equal length parisons. These parisons are individually stretch blow-moulded whilst still at orientation temperature, to form packaging containers having a substantial biaxial (i.e. longitudinal and circumferential) orientation of their polymer material.

Such an arrangement, however, suffers from various shortcomings which largely arise from the continuous nature of the tube being handled. In particular, the oven required is necessarily large and thermally inefficient, and the serial production of heated parisons leads unavoidably to wall thickness and other variations if for high manufacturing throughput the containers are moulded from the parisons two or more at a time; this latter inconsistency arises because of the different thermal histories of the parisons of each group being moulded.

In a further known system for forming thermoplastics parisons for stretch blow-moulding the parisons to be moulded are severed from the front of the extruded tube after it has been sized and cooled but in advance of the oven by which the thermoplastics material is heated to orientation temperature. The severed parisons are carried individually through the oven on spaced pegs of a chain conveyor which is circulated at a constant speed. The parisons emerge from the oven at orientation temperature and in succession, and they are subsequently stretch blow-moulded to form packaging containers.

This further system has various advantages over the system previously described, amongst which are that the oven can be made smaller and thermally more efficient. However, the requirement for the parisons to be handled individually between their severance from the extruded tube and the blow moulding station involves substantial complexity, particularly in the oven, and carries its own space penalty; moreover, the heated parisons are again produced from the oven one at a time, so leading to the above mentioned quality variations if the parisons are to be simultaneously moulded in groups of two or more parisons.

The present invention is concerned with the stretch blow-moulding of thermoplastics articles simultaneously in groups of a predetermined number greater than one, and in this context seeks to overcome or substantially avoid at least some of the shortcomings of the two prior art systems described above. In accordance with a first aspect thereof the invention therefore provides a method of stretch blow-moulding thermoplastics articles from heated parisons of a thermoplastics material, wherein the parisons are severed from thermoplastics sticks each of which comprises a predetermined integral multiple of parison lengths greater than one, the sticks being formed by severance from the leading end of a continuously extruded thermoplastics tube and being individually heated to orientation temperature, subsequent to heating the sticks being presented for severance as successive groups of two or more associated sticks which are advanced longitudinally while disposed in parallel, laterally aligned relation, the articles being formed by repeated multiple stretch blow-moulding operations performed upon parison groups each created by a simultaneous severance operation upon the leading ends of the sticks of a said presented group.

By use of a method as defined in the previous paragraph, the parisons of each group to be simultaneously stretch blow-moulded may be given the same thermal history, so that the dimensional consistency of the moulded articles can be improved significantly over the prior art methods outlined above. The handling and manipulation of the parisons as multiple parison sticks rather than individually enables complexity to be reduced whilst retaining many of the potential benefits accruing from a subdivided (rather than continuous) form of the thermoplastics material. Whilst it is preferred that the groups of sticks should be formed at the downstream end of the oven, this is not essential; the sticks may, if desired, pass through the oven with their grouping already defined.

The invention further provides, according to a second aspect thereof, apparatus for performing the method defined above in the penultimate paragraph. Accordingly, the invention provides apparatus for stretch blow-moulding thermoplastics articles from heated parisons of a thermoplastics material, which comprises:

(a) tube-forming and advancing means arranged for producing a continuously extruded thermoplastics tube of predetermined radial dimensions, and for advancing the same longitudinally;

(b) first severance means repeatedly operable upon the leading end of the advanced tube so as to sever therefrom a succession of thermoplastics sticks each of which comprises a predetermined integral multiple of parison lengths greater than one;

(c) heating means arranged for heating the sticks individually to orientation temperature;

(d) collation means arranged to form the sticks into groups of associated sticks;

(e) presentation means operable in succession upon the groups of sticks subsequent to their heating by the heating means, to advance the sticks of each group longitudinally whilst disposed in parallel, laterally aligned relation within their group;

(f) second severance means repeatedly operable simultaneously upon the leading ends of the sticks of that group which is at the time being presented by the presentation means to form from those sticks a plurality of successive parison groups each formed of one parison per stick and being equal in number to the said predetermined integral multiple of parison lengths; and (g) stretch blow-moulding means repeatedly operable to perform a multiple stretch blow-moulding operation upon each of the parison groups produced by the second severance means whereby from each parison group to form a plurality of thermoplastics articles equal in number to the number of sticks in a said group of sticks.

In order that the invention may be more fully understood two embodiments thereof will now be described, by way of example, and with reference to the accompanying diagrammatic drawings, in which.

Figure 1:
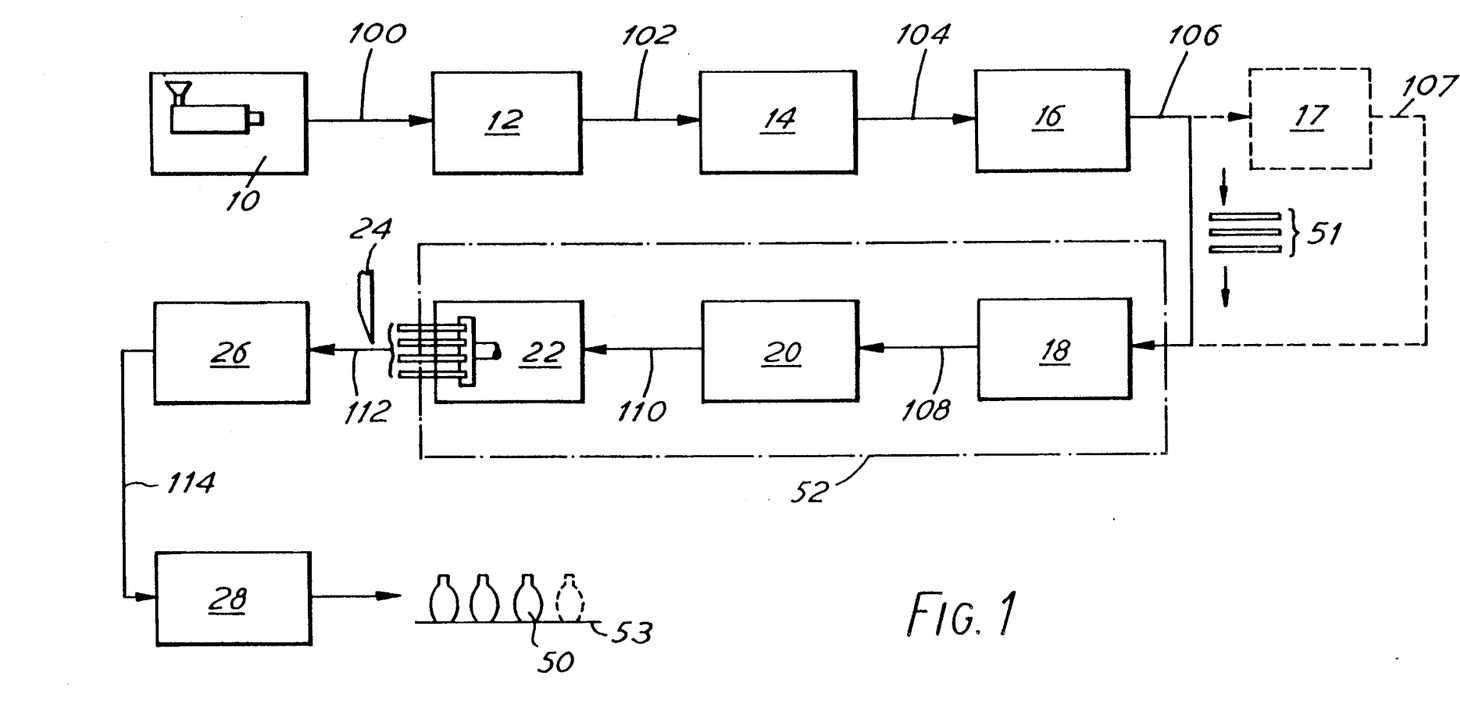
FIG. 1 is a schematic diagram depicting the various stages of a process in accordance with the invention for stretch blow-moulding containers from a thermoplastics material.

Referring now to FIG. 1, a process is shown for stretch blow-moulding containers 50 for a food or beverage product from tubular parisons of a thermoplastics polymeric material (such, for example, as polypropylene, polyvinylchloride or polyethylene terephthalate). The process is arranged for moulding several parisons at a time, and has successive stages 10 to 28, as will now be described. For the purpose of this description it 11 be assumed that four parisons are to be moulded in each moulding operation, although it will be appreciated that a number of parisons other than four may be simultaneously moulded if desired.

In the first stage 10 of the process the thermoplastics material in granular form is heat-softened and plasticised, and extruded through an annular die orifice as a continuous tube which advances longitudinally at a predetermined speed to form the stage output 100.

The extruded tube is subjected to a sizing operation 12 to give it required cross-sectional dimensions, and thence passes, as stage output 102, to a cooling stage 14. In the cooling stage 14 the tube is cooled to below its glass transition temperature so as to emerge as a rigid, longitudinally moving, continuous hollow rod.

From the cooling stage 14 the continuous tube passes, as output 104, to a first severance stage 16. At the stage 16 the leading end of the tube is repeatedly cropped at regular intervals of time to produce, as output 106, sticks each having a length which is equal to an integral multiple of the length of the parisons from which the containers 50 are to be formed; Applicants prefer for the stick length to be 4,5,6 or 7 times the length of one parison, although greater or lesser multiples may be used if desired. For the purposes of this description each stick is assumed to be five times the parison length. Three of the sticks are represented diagrammatically in FIG. 1 and denoted by the reference numeral 51.

From the severance stage 16, the sticks 51 are moved at a uniform spacing through a heating stage 18 by which they are individually heated to orientation temperature. Movement of the sticks between the severance and heating stages may be direct, or it may occur via a storage stage 17 which, in addition to storage, may, if desired, also include transportation between different manufacturing sites or locations. The sticks received in the heating stage 18 are therefore received directly from the output 106 or, via the storage stage 17, from the output referenced 107.

Following the heating stage 18 is a group-forming stage 20 by which the heated sticks received as output 108 from the heating stage are formed into successive groups each containing the same number of sticks as the number of parisons which are to be simultaneously moulded; thus, in the process as particularly described, the sticks are marshalled into groups of four.

The groups of sticks formed in stage 20 are passed in sequence on output 110 to a presentation stage 22. The heating, group-forming and presentation stages 18,20 and 22 are closely associated with one another thermally, so that the sticks 51, having been heated to a predetermined orientation temperature in the heating stage, are held accurately at that temperature whilst moving through the group-forming and presentation stages.

As shown, the stages 18, 20 and 22 share a common thermal enclosure which is indicated by a broken line and denoted by the reference 52. In the presentation stage each group of four sticks, with its component sticks mutually parallel and laterally aligned as depicted, is advanced in turn through a wall of the enclosure 52 in successive longitudinal movements each of one parison length.

Following the presentation stage is a second severance stage which is represented by a knife 24; this stage is effective upon the projecting leading ends of the sticks 51 of each group in turn so as, by repeated simultaneous severance operations upon the sticks, to create a succession of parison groups each formed of one parison from each stick.

The severance operations are performed while the sticks are stationary between movements, and it will be understood that, for each group of sticks four severance operations are performed and five parison groups are created corresponding to the five parison lengths per stick.

The parisons formed by the severance stage 24 are transferred in their groups as output 112 to the next stage 26 of the process, at which they are stretch blow-moulded to form packaging containers. The parisons of each group are blown simultaneously, and because they have a substantially identical thermal history subsequent to their entry to the heating stage 18, most particularly subsequent to their leaving the thermal enclosure 52, the containers 50 which they form are highly uniform and have accurately predictable wall thicknesses. The containers formed from the sticks of a group are likewise highly uniform for the same reason.

As the final stage of the process the containers, after cooling and ejection, pass as output 114 to stage 28 at which unwanted plastics material is removed by a wheel trimming and/or other operation. The containers 50 then pass onto a conveyor 53 for subsequent packing and despatch.

The following description is given to illustrate two ways (and in a non-limiting manner) how the process shown in FIG. 1 and described above might be achieved.

Stages 10,12 and 14 may be provided by a conventional tube extrusion line including an extruder (for stage 10), a sizing die (for stage 12) and a spray trough and water bath (for stage 14); a haul-off device (not shown) will follow the cooling arrangement and be arranged to generate a positive tension in the tube downstream of the sizing die.

At stage 16 the cold and therefore substantially rigid extruded tube is cut accurately whilst advancing at its predetermined speed. This operation may be achieved mechanically, for example by a circular saw which is advanced in unison with the tube during severance and thereafter quickly returned to its original position, but Applicants prefer to use a stationary laser for simplicity and speed of operation, and in order to avoid any substantial generation of polymer debris.

Figure 2:
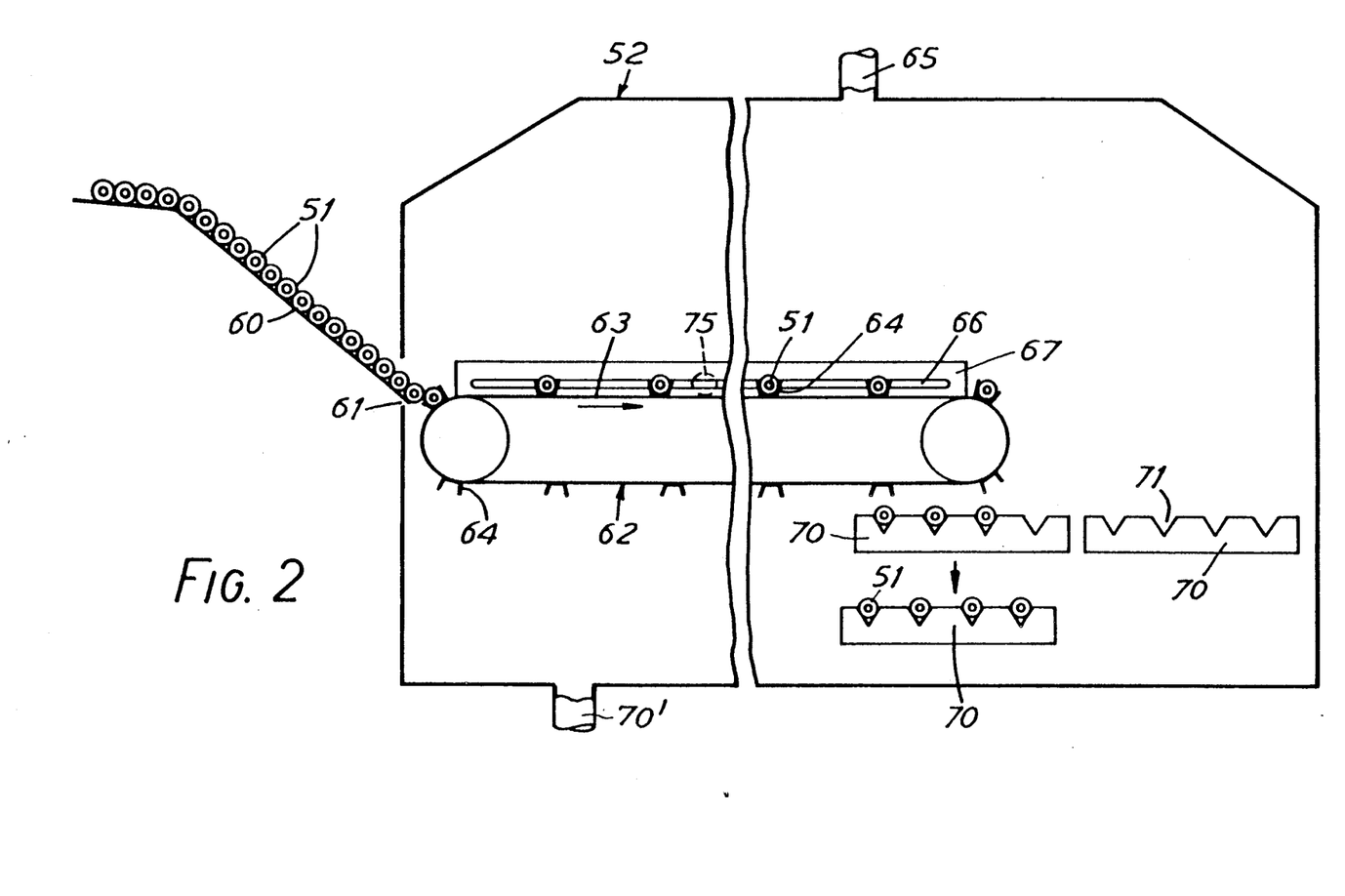
FIG. 2 diagrammatically illustrates how part of the process of FIG. 1 may be achieved in one embodiment thereof.

The storage stage 17 may be conventional, and the sticks 51 passing on outputs 106, 107 may likewise be combined in a conventional manner FIG. 2, to which the following description is now directed, shows diagrammatically one possible arrangement for implementing the stages 18, 20 and 22 of the process.

Referring now to FIG. 2, the sticks 51 arrive on an inclined magazine 60 in which they are held side-by-side to form a static head. At the base of the magazine the sticks enter the thermal enclosure 52 under gravity, via a narrow opening 61 in an end wall of the enclosure.

An endless conveyor 62 having a horizontal upper run 63 is driven to circulate within the enclosure in the direction indicated. The conveyor has regularly spaced and laterally extending elongate troughs 64 each capable of receiving and holding one stick 51. It should be understood that the conveyor is shown considerably foreshortened in the drawing.

As it passes the opening 61 in the upward direction, each trough 64 in turn picks off the bottom stick held in the magazine, and subsequently carries it along the upper conveyor run 63. A stop (not shown) associated with the opening holds the sticks in the magazine until they are individually carried off in this way.

Hot air enters the enclosure by an hot air inlet 65 in the top of the enclosure 52, and thence passes downwardly through and past the conveyor and back to the inlet via an outlet 70' in a closed path which includes a suitable heater and fan (not shown). In moving through the conveyor the hot air passes the troughs 64 and the sticks 51 held in them, and so heats the sticks convectively to their desired orientation temperature. Additional heating for the sticks is provided by further flows of hot air which are caused to pass along the interiors of the sticks. This additional hot air is supplied by an elongate nozzle 66 which is formed in a hot air chamber 67 extending along one side of the enclosure. The chamber 67 itself is supplied with hot air through a duct 75. The nozzle directs hot air inwardly of the enclosure in such a way that it enters the adjacent ends of the passing sticks.

In the hot air flow path the duct 75 is arranged in parallel relation with the inlet 65, the air which flows from the nozzle and through the interiors of the sticks subsequently rejoining the main hot air flow and recirculating again through the heater and fan. By virtue of the external and internal heating provided in this way, the sticks are raised quickly and uniformly to their desired orientation temperature, and the conveyor 62 may be correspondingly short in length.

Instead of the chamber 67 and elongate nozzle 66, the device for supplying hot air to the interiors of the sticks 51 may be in accordance with the teachings of our GB Patent Publication No. 2157977A (Agents Ref. E2867), the content of which is imported herein by reference.

In addition to the conveyor 62, three identical trolleys 70 are disposed within the thermal enclosure 52. Each trolley has, formed in its upper face, four regularly spaced and parallel, open-ended recesses 71 dimensioned for receiving and holding individual sticks 51 which have been received from the conveyor 62.

The trolleys are mounted horizontally and arranged for intermittent circulation in unison and in an anticlockwise direction about a closed, generally triangular path to the apices of which they move in succession. As shown, one apex of this path is disposed beneath the downstream end of the conveyor 62 as shown, a second apex is located below the first, and the third apex is located horizontally to one side of the first.

The trolleys in turn have their recesses loaded with sticks 51 at the first apex by progressive movement of the trolley longitudinally of the conveyor, in such a way that the sticks arriving on the conveyor are deposited and held in the recesses. In this way four sticks are collected on the trolley, so forming a group from which five groups of four parisons each can later be severed. Whilst the trolley at the first apex is being filled, the loaded trolley at the second apex beneath it is being emptied of its group of sticks by intermittent longitudinal movement of the sticks, in increments of one parison length, across the trolley and through suitable dimensioned apertures (not shown) in a side wall of the thermal enclosure 52. The movement of the sticks through the apertures is partially controlled by pusher rams (not shown) projecting through one side wall of the enclosure and engaging the adjacent ends of the sticks, and partially by two or more groups of clamping devices (not shown) which operate in succession to engage the leading ends of the sticks which are about to be severed and after severance to carry the cut parisons away as a group for multiple stretch blow-moulding. It will be understood that the clamping, severance and removal of the parison lengths takes place outside the enclosure 52.

The third apex of the triangular path is a holding position at which the trolleys are located between successive emptying and loading operations.

The stretch blow-moulding stage 26 may be arranged in suitable manner to perform multiple operations upon the parison groups which they receive. The clamping devices mentioned above may be effective to hold the parisons for the moulding operation, or they may be arranged to pass the parisons to further parison-holding devices provided for that purpose. The moulding operation itself may be conventional, as may the removal of unwanted plastics material from the moulded containers at the stage 28.

In a possible modification of the process described with reference to FIG. 1, the sticks 51 are formed into their desired groups prior to entry into the thermal enclosure and when unheated. The sticks are therefore heated to orientation temperature with their grouping already defined.

Figure 3:
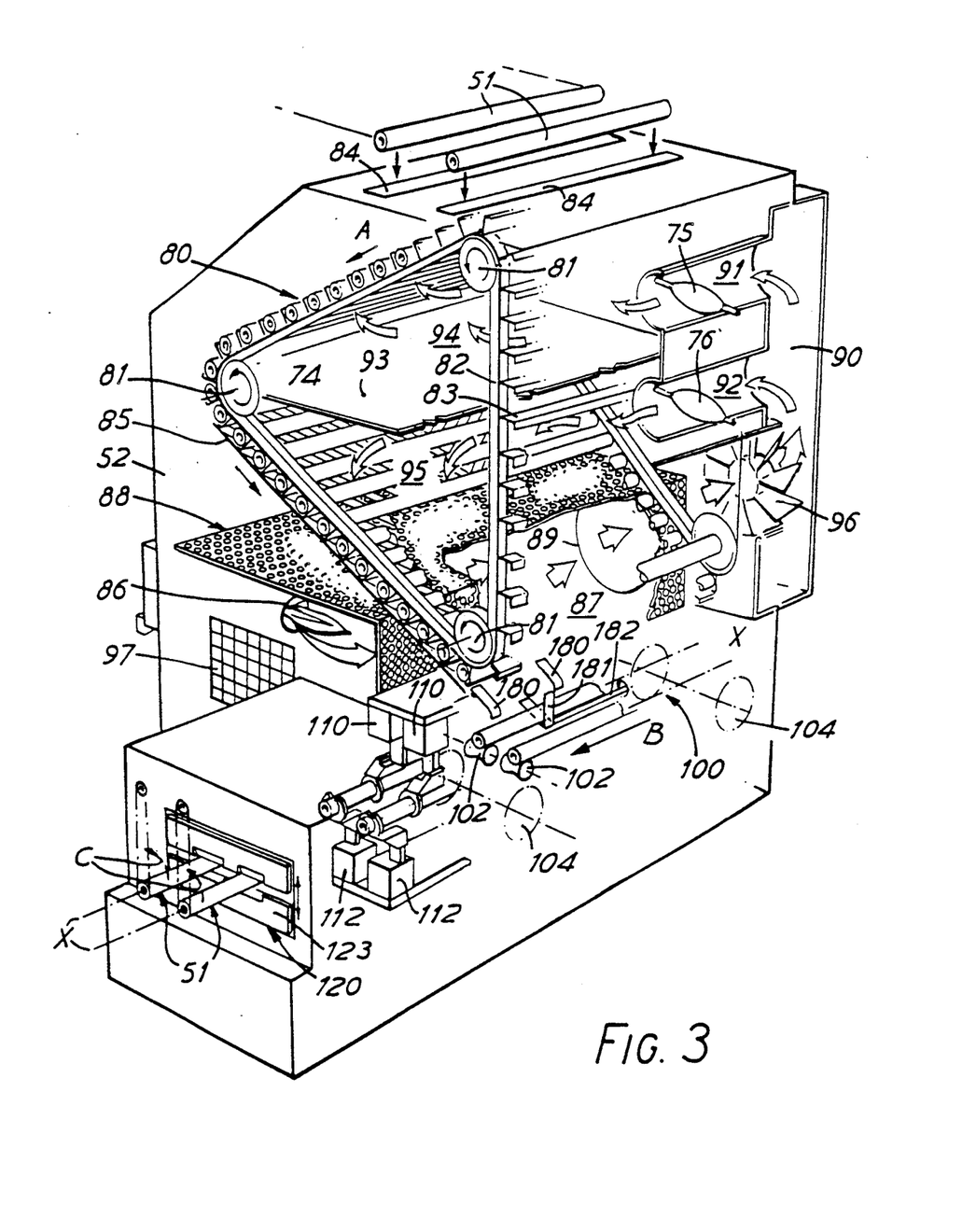
FIGS. 3 to 6 diagrammatically illustrate apparatus for performing part of the process of FIG. 1 in a second embodiment thereof.

FIG. 3 shows a further arrangement for implementing the stages 18, 20 and 22 of FIG. 1, for a process in which two sticks 51 are presented at a time for blow-moulding in successive lengths of one parison each. It is to be understood, however, that by suitable modification a greater number of sticks can be operated upon simultaneously.

Referring to FIG. 3, a chain conveyor 80 is mounted within thermal enclosure 52 for circulation around rollers 81, and follows a triangular path having two oppositely inclined sides and a third, vertical side as shown. The conveyor is drivable intermittently by an electric motor (not shown) and has carrier chains 82 on which are mounted regularly spaced flights 83 arranged for locating the sticks 51 as they circulate within the enclosure as indicated by the arrow A. The sticks, at room temperature, are fed onto the conveyor through apertures 84 at the top of the enclosure, and are subsequently heated during the dwell periods of their movement down the inclined runs of the conveyor. In addition to the location provided by the flights 83 the sticks are supported as they move down the inclined runs of the conveyor by spaced bars 74 arranged in the form of a chevron. The bars 74 of the lower conveyor run are connected at their ends by end plates of which one is shown and denoted 85. As they move with the conveyor, the sticks are rotated by frictional contact with the bars 74 beneath them, this rotation helping to ensure their uniform heating.

The heat for heating the sticks 51 is generated by a gas burner mounted in the side wall of the enclosure beneath the lowermost of the inclined conveyor runs, and the flames 86 of which are visible. The burner heats the air in a hot air plenum 87 which is separated from the part of the enclosure housing the chain conveyor 80 by a perforated plate 88. From the plenum 87 the heated air passes through an opening 89 in an end wall of the enclosure and into a distribution chamber 90 mounted on the end wall. From there the heated air returns through the end wall of the enclosure and passes into the interior space defined within the chain conveyor 80 via two short conduits 91,92 arranged in parallel.

The interior space of the chain conveyor is subdivided by a horizontal plate 93 into upper and lower plenums 94, 95 each associated with one of the inclined runs of the conveyor. Heated air passing from the distribution chamber 90 and into the upper conduit 91 moves into the upper plenum 94 and thence passes through nozzles (not shown) by which it is directed, through the gaps between the respective support bars 74, at the dwell or stationary positions of those of the sticks which are moving along the upper inclined run of the conveyor, heating those sticks as it does so; in a similar manner, further heat is supplied to the sticks as they pass along the lower conveyor run by heated air which passes through the lower conduit 92 to the lower plenum 95 and thence through further nozzles associated with the dwell positions of the sticks on the lower conveyor run. Butterfly valves 75,76 are mounted in the conduits 91,92 and controllable to vary the gas flow through the conduits either differentially or in unison as desired.

After passing the sticks 51 on the conveyor the heated air flows from the two conduits 91,92 are recombined and return to the hot air plenum through the perforations in the plate 88, so completing a closed path for air to circulate within the thermal enclosure. Air circulation around this closed path is assisted by a fan 96 which is located in the distribution chamber 90 and driven to rotate by an electric motor (not shown).

An opening 97 in the end wall of the thermal enclosure remote from the distribution chamber 90 ensures that the pressure of the environment of the chain conveyor, and hence the sticks 51 being heated, is slightly above atmospheric pressure; in this way a high degree of uniformity of the heating of the sticks is achieved.

The heated sticks 51 are removed in groups of two from the chain conveyor 80 at the bottom of its lower inclined run. Positioned for receiving them as they fall from the conveyor is the horizontal upper run of a further chain conveyor 100 carrying pairs of laterally aligned and free-running, waisted rollers one pair of which is shown and indicated by the reference numeral 102. The conveyor 100 is trained around end rollers 104 and is intermittently drivable by an electric motor (not shown) so that its upper run moves in the direction indicated by the arrow B.

The rollers 102 of the conveyor 100 are longitudinally aligned to provide two upwardly facing parallel troughs on which the sticks 51 of each pair in turn are received. The movement of the sticks onto these troughs in pairs is controlled by static guide bars 180 (two shown) and movable guide bars 181 (one only shown). The movable guide bars in their depressed positions (shown in broken line) cooperate with the static guide bars to guide the first stick of the pair into the trough which is nearest the reader in FIG. 3. They are then raised to their full line position by shaft 182 and an attached actuator (not shown), so allowing the second stick of the pair to be guided by the static guide bars 180 into the other trough. The conveyor 100 advances the sticks horizontally by friction along respective presentation axes XX, towards pairs of alternately operable upper and lower gripper assemblies 110, 112 which are also shown in FIGS. 4 and 5.

Each gripper assembly has a pair of opposed pivoted jaws 114 operable in unison by an actuator (not shown) to grasp a stick received between them. The gripper assemblies as a whole are reciprocable longitudinally of the presentation axes XX by means of actuators 118, 119 (FIG. 4), from an upstream position at which they grasp a stick received from the chain conveyor 100, and a downstream position at which their jaws are opened and the sticks are released having been advanced by the length of one blow-moulding parison. Having performed a stick-advancing operation in this way, each upper or lower gripper assembly, with its jaws still open, is returned to its upstream position in readiness for the next operation. During its upstream movement is passes the associated lower or upper gripper assembly which is at the time performing the succeeding stick-advancing operation.

The pairs of associated upper and lower gripper assemblies thus operate in a hand-over-hand fashion to advance the sticks received from the chain conveyor 80 in incremental movements of one parison length. The nomenclature "hand-over-hand" is accordingly used hereinafter for brevity.

Figure 4:
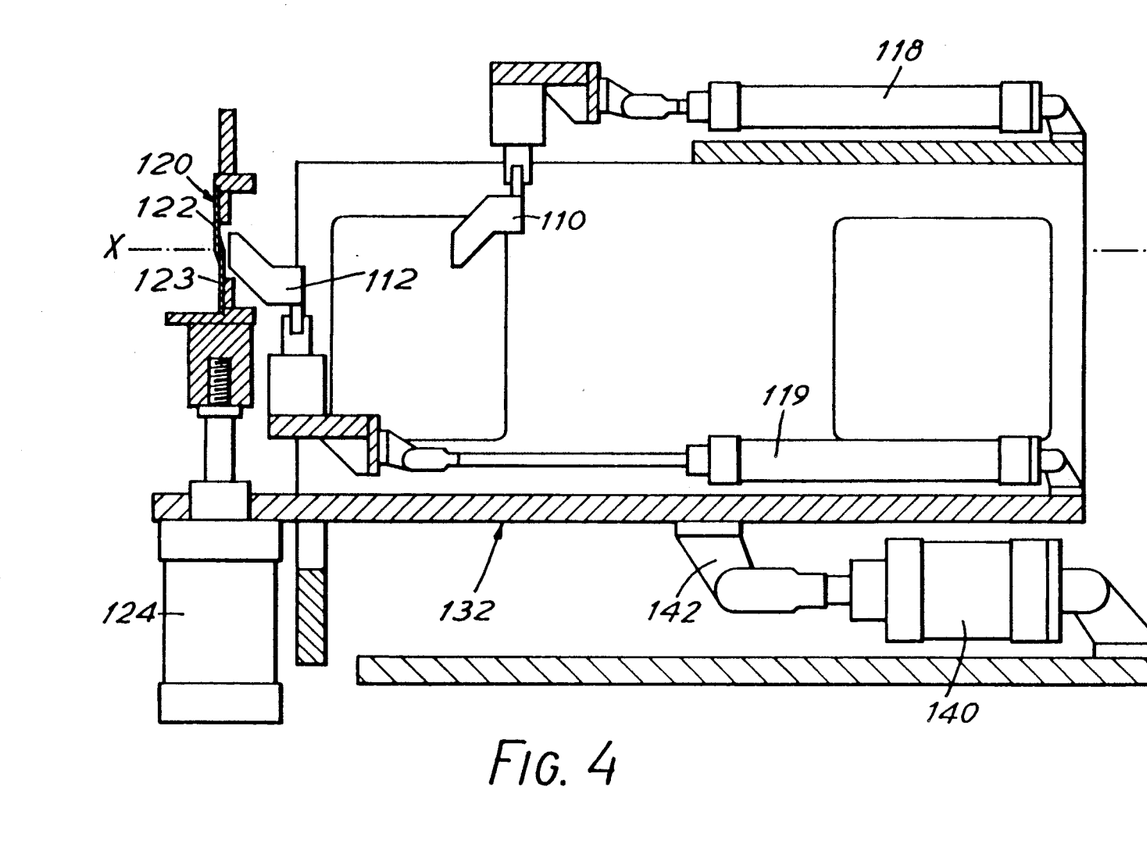
Figure 5:
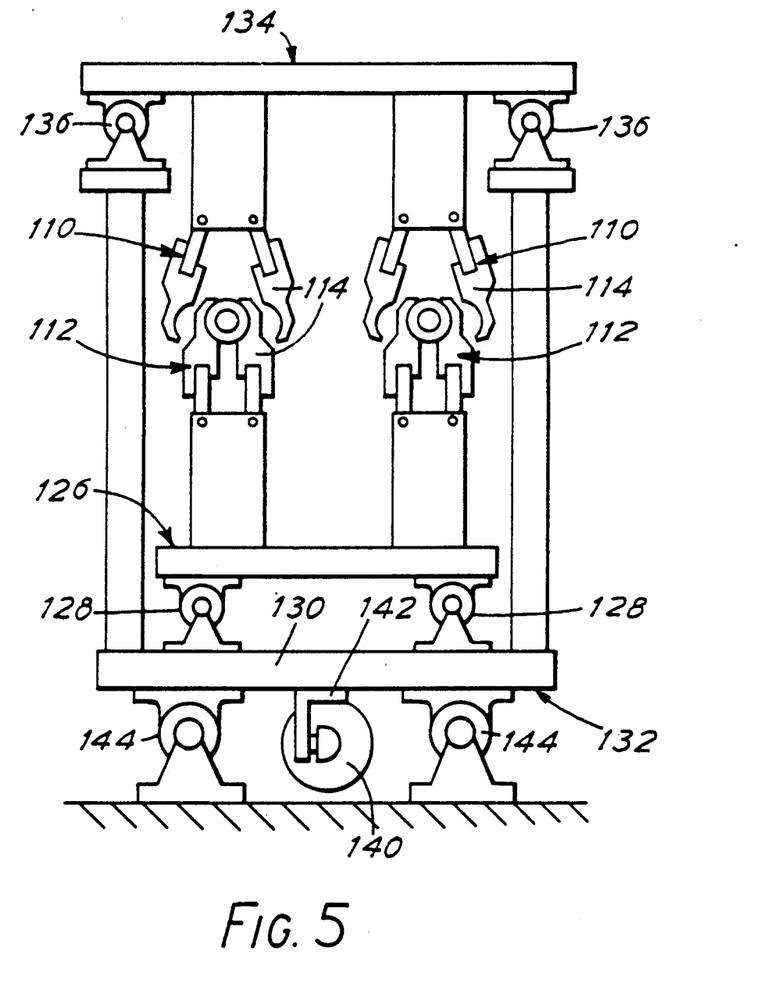

FIG. 4 depicts the lower and upper gripper assemblies respectively in their limiting downstream and upstream positions. A guillotine 120 having mechanically linked and vertically movable upper and lower blades 122, 123 is mounted immediately in front of the downstream position, and is operable by means of an actuator 124 to sever from the sticks 51 the parison lengths which are presented in succession by operation of the gripper assemblies 110, 112. As is shortly to become apparent, severance takes place at a time when the parison lengths are supported from their leading ends by the apparatus by which the parison lengths are to be formed into bottles. The guillotine is mounted in the wall of the thermal enclosure 52 so that from the time they enter the enclosure through the apertures 84 as multi-parison sticks until they leave the guillotine 120 individually, the parison lengths are in a heated and temperature-controlled environment; moreover, they have the same thermal history. Because of thermal sensitivity of the equipment associated with the hand-over-hand process, in particular the actuators 116 and 118, the part of the thermal enclosure housing the latter equipment may be at a substantially lower temperature than the temperatures to which the chain conveyor 80 is subject.

FIG. 5 illustrates how the gripper assemblies 110, 112 are supported for movement The lower gripper assemblies 112 are carried by a trolley 126 which is supported by linear bearings 128 from a base plate 130 of a carriage 132. Likewise, the upper gripper assemblies 110 are attached to a further trolley 134 which is supported from the carriage by further linear bearings 136. For brevity the actuators 118,119 are omitted from FIG. 5, but from FIG. 4 it will be seen that they are arranged to move their associated gripper assemblies in relation to the carriage.

An actuator 140 (FIGS. 4,5) and is arranged to connect the carriage 132 to the machine frame, having one end attached to the carriage by a support bracket 142 and having its other end suitably attached to the machine frame. As will shortly become apparent, the function of this actuator is to impart a small backwards (i.e. upstream) movement to the carriage and its component parts immediately after severance of a pair of parison lengths and before those parison lengths have been moved away from blow-moulding. The carriage is returned to its original position as soon as the parison lengths have been removed. Linear bearings 144 (FIG. 5) support the carriage from the machine frame to allow this limited back-and-forth movement.

The parison lengths of each pair, after severance from their parent sticks 51 by the guillotine 120 (or, in the case of the last parison lengths of the sticks, after their trailing ends have been cropped by the guillotine at the correct length) are moved to vertical positions in preparation for the blow-moulding operation which follows. In FIG. 3, the parison lengths in these vertical positions are represented by broken lines, the arrows C indicating the movements which are involved. The backward movement of the carriage 132 discussed in the previous paragraph separates the cut parison lengths from the guillotine by a sufficient distance to ensure that the guillotine cannot impede the movements of the parison lengths to their vertical positions.

Figure 6:
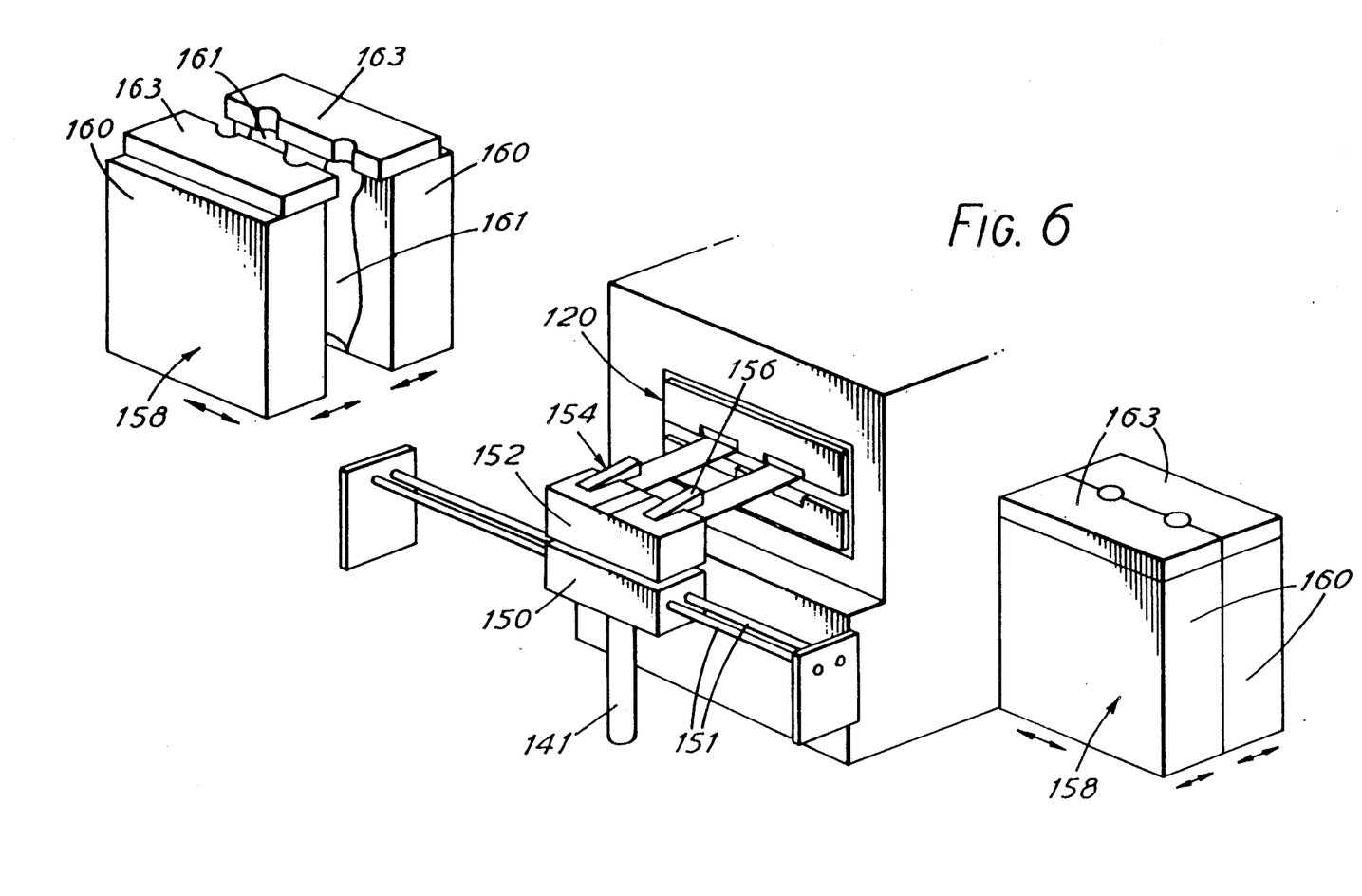

The apparatus by which the heated parison lengths from the device of FIGS. 3 to 5 are blow-moulded to form bottles is shown in FIG. 6, to which reader's attention is now directed. The apparatus is shown in relation to the guillotine 120, to which it is closely adjacent and the two parison lengths which at the time in question are still attached to their parent polymer sticks 51 and are therefore horizontally disposed.

The blow-moulding apparatus (FIG. 6) has a support member 150 mounted for sliding movement along support rods 151 which extend transversely of the presentation axes XX of the apparatus of FIGS. 3 to 5. The member 150 supports a clamp carriage 152 in which two clamp or gripper devices 154 are pivotally mounted for movement in unison between a horizontal position (as shown) and an upstanding vertical position. An actuator 141 enables the clamp carriage with the clamp devices to be lifted in relation to the support member.

The pivotal axis of the clamp devices is transverse to the presentation axes XX and parallel to the support rods 151, and is so located in relation to the guillotine 120 that the clamp devices when in their horizontal positions are capable of receiving and gripping the leading ends of the parison lengths presented to them by the hand-over-hand operation of the gripper assemblies 110,112 as previously described. For gripping the parison lengths so presented the clamp devices have pairs of opposed and pivotally mounted jaws 156 which are openable or closable together by actuators. In FIG. 6 only the upper jaws 156 are visible and the actuators are not shown.

Mounted one on each side of the support member are two identical mould assemblies 158 each having two mould halves 160 arranged so as together to define two mould cavities 161 of which the centreline spacing corresponds to the spacing of the presentation axes XX. The mould halves are movable towards and away from one another by actuators (not shown), and carry spring-loaded clamping plates 163 on their top ends; furthermore, the mould assemblies as a whole are movable transversely of the presentation axes towards and away from the support member 150.

After the jaws 156 have closed onto the parison lengths presented by the gripper assemblies 110, 112 and the parison lengths have been severed, the clamp devices 154 are moved to their vertical positions, so swinging the parison lengths upwardly, and at the same time the actuator 140 is operated to momentarily retract the carriage 132 as previously described.

With the parison lengths held vertical by the clamp devices 154 at their lower ends, the support member 150 is traversed along the support rods 151 so as to move the parison lengths towards one of the mould assemblies 158 which at this time is open. At the same time the open mould assembly is moved towards the support member to reduce cooling and possible deformation of the parison lengths.

When this combined movement has brought the parison lengths into alignment with the mould cavities 161 of the open mould assembly, the actuator 141 is operated to raise the clamp carriage 152, so bringing the upper ends of the parison lengths to the level of the clamping plates 163. The mould assembly is then partially closed to cause the clamping plates to resiliently grip the upper ends of the parison lengths, after which the clamp carriage 152 is lowered so as to elongate the parison lengths and thereby molecularly orientate their polymer material in the longitudinal direction. The mould assembly is then fully closed to form the mould cavities 161 about the parts of the parison lengths lying above the clamp devices 154, and those parison length parts are then inflated into the mould cavities to form bottles in conventional manner.

The closing of the mould assembly frees the clamp devices 154 for operation upon the next pair of parison lengths to be severed by the guillotine 120. The clamp devices are opened, and the support member 150 is returned to its original position in preparation for receiving and gripping the succeeding parison lengths. At the same time the mould assembly is returned to its original position; subsequently it is opened to eject the moulded bottles and in preparation for receiving a further pair of parison lengths. The sequence described above is then repeated in relation to the second of the two mould assemblies 158.

What is claimed is:

1. A method of stretch blow-moulding thermoplastics articles from heated parisons of a thermoplastics material, wherein the parisons are severed from thermoplastics sticks each of which comprises a predetermined integral multiple of parison lengths greater than one, the sticks being formed by severance from a leading end of a continuously extruded thermoplastics tube and being individually heated to orientation temperature, subsequent to heating, the sticks being presented for severance as successive groups of two or more associated sticks which are advanced longitudinally while disposed in parallel, laterally aligned relation, the articles being formed by repeated multiple stretch blow-moulding operations performed upon parison groups each created by a simultaneous severance operation upon the leading ends of the sticks of a said presented group.

2. A method according to claim 1, wherein the sticks are regularly spaced apart whilst they are being individually heated to orientation temperature, and are subsequently formed into their said groups of associated sticks.

3. A method according to claim 1, wherein the sticks are formed into their said groups of associated sticks before being individually heated to orientation temperature.

4. Apparatus for stretch blow-moulding thermoplastics articles from heated parisons of a thermoplastics material, which comprises:
   (a) tube-forming and advancing means arranged for producing a continuously extruded thermoplastics tube of predetermined radial dimensions, and for advancing the continuously extruded tube longitudinally;
   (b) first severance means repeatedly operable upon a leading end of the advanced tube so as to sever therefrom a succession of thermoplastics sticks each of which comprises a predetermined integral multiple of parison lengths greater than one;
   (c) heating means arranged for heating the sticks individually to orientation temperature;
   (d) collation means arranged to form the sticks into groups of associated sticks;
   (e) presentation means operable in succession upon the groups of sticks subsequent to their heating by the heating means, to advance the sticks of each group longitudinally whilst disposed in parallel, laterally aligned relation within their group;
   (f) second severance means repeatedly operable simultaneously upon the leading ends of the sticks of that group which is at the time being presented by the presentation means to form from those sticks a plurality of successive parison groups each formed of one parison per stick and being equal in number to the said predetermined integral multiple of parison lengths; and
   (g) stretch blow-moulding means repeatedly operable to perform a multiple stretch blow-moulding operation upon each of the parison groups produced by the second severance means whereby from each parison group to form a plurality of thermoplastics articles equal in number to the number of sticks in a said group of sticks.

5. Apparatus according to claim 4, wherein the heating means, collation means and presentation means are arranged for sequential operation within a common thermal enclosure through a wall of which the presentation means is arranged to push the sticks for severance by the second severance means.

6. Apparatus according to claim 4, wherein the heating means is operable upon the sticks when they are spaced regularly apart and moving transversely of their lengths.

7. Apparatus according to claim 4, wherein the heating means comprises an endless conveyor arranged to support the sticks in spaced relation whilst they are being heated to orientation temperature, the conveyor defining an interior space to which heated air is supplied, the interior space being subdivided to form at least two plenums from which heated air may pass against the sticks on the conveyor, and valve means being provided by which the supply of heated air to the said plenums may be controlled.

8. Apparatus according to claim 4, arranged to present the sticks for severance by the second severance means by a hand-over-hand method of presentation.

9. Apparatus according to claim 4, wherein the second severance means and the presentation means are mounted for common backward movement in relation to the blow-moulding means and longitudinally of the advancing movement of the sticks by the presentation means, the apparatus further including actuator means arranged for effecting a said movement of the second severance means and the presentation means when the second severance means has been effective upon the sticks of a group, so as to separate the second severance means from the severed parisons.

10. Apparatus according to claim 4, wherein the stretch blow-moulding means have first gripping means arranged to grip the leading ends of the parisons of a group presented by the presentation means before those parisons are severed by the second severance means, to support the parisons during severance by the second severance means and thereafter to swing them to a vertical, upstanding position, second gripping means arranged to grip the upstanding parisons at their face upper ends, means to move the first and second gripping means vertically apart whereby to elongate said parisons between them and impart longitudinal orientation to their thermoplastics material, and a blow-mould having mould parts defining a mould cavity for each parison, the blow-mould being closable onto the uplifted and elongated parisons and having an associated supply of pressurised fluid for inflating the parisons within the closed mould.

11. Apparatus according to claim 10, having two blow-moulds alternately operable upon the groups of parisons presented by the presentation means.

12. Apparatus according to claim 5, wherein the heating means is operable upon the sticks when they are spaced regularly apart and moving transversely of the lengths.

* * * * *